United States Patent [19]

Fraser

[11] Patent Number: 5,253,978
[45] Date of Patent: Oct. 19, 1993

[54] TURBINE BLADE REPAIR

[75] Inventor: Michael J. Fraser, Gloucestershire, United Kingdom

[73] Assignee: Turbine Blading Limited, United Kingdom

[21] Appl. No.: 874,298

[22] Filed: Apr. 24, 1992

[30] Foreign Application Priority Data

Apr. 26, 1991 [GB] United Kingdom ............... 9109016

[51] Int. Cl.⁵ .............................................. F01D 5/10
[52] U.S. Cl. ................................. 416/190; 416/194; 416/196 R; 416/500; 29/889.1; 228/119; 228/170; 228/171
[58] Field of Search ............... 416/189, 190, 192, 194, 416/195, 196 R, 500; 29/889.1; 228/119, 170, 171

[56] References Cited

U.S. PATENT DOCUMENTS

| 3,912,151 | 10/1975 | Martin et al. | 228/171 |
|---|---|---|---|
| 4,118,147 | 10/1978 | Ellis | 416/500 |
| 4,477,226 | 10/1984 | Carreno . | |
| 4,480,957 | 11/1984 | Patel et al. | 416/500 |
| 4,514,143 | 4/1985 | Campbell | 416/500 |
| 4,611,744 | 9/1986 | Fraser et al. | 29/889.1 |
| 4,872,810 | 10/1989 | Brown et al. . | |
| 4,896,408 | 1/1990 | Fraser | 29/889.1 |
| 5,031,313 | 7/1991 | Blair et al. | 29/889.1 |
| 5,033,938 | 7/1991 | Fraser et al. | 228/119 |

FOREIGN PATENT DOCUMENTS

| 303433 | 2/1989 | European Pat. Off. . | |
|---|---|---|---|
| 0359586 | 3/1990 | European Pat. Off. | 29/889.1 |
| 0213379 | 10/1985 | Japan | 228/171 |
| 0001333 | 5/1862 | United Kingdom | 228/171 |
| 2091139 | 7/1982 | United Kingdom | 29/889.1 |
| 2198667 | 6/1988 | United Kingdom . | |

OTHER PUBLICATIONS

Drahy, Josef; "New Approach to Dynamic Problems of Steam-Turbine Blades"; Technical Digest 7-81 '68 (no date).

Primary Examiner—Edward K. Look
Assistant Examiner—Christopher Verdier
Attorney, Agent, or Firm—Armstrong, Westerman, Hattori, McLeland & Naughton

[57] ABSTRACT

A method of repairing a turbine blade comprising the steps of ascertaining a normal vibration characteristic of the blade, separating an outer end part of the blade from a residual inner part of the blade and subsequently securing a new end part to the residual part so that a joint between the new end part and the residual part is positioned in a predetermined relationship to said vibration characteristic.

14 Claims, 4 Drawing Sheets

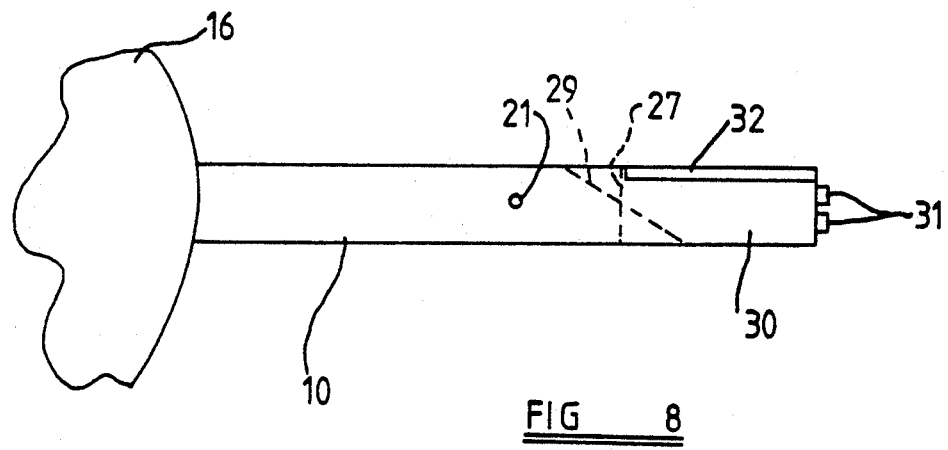
FIG 8
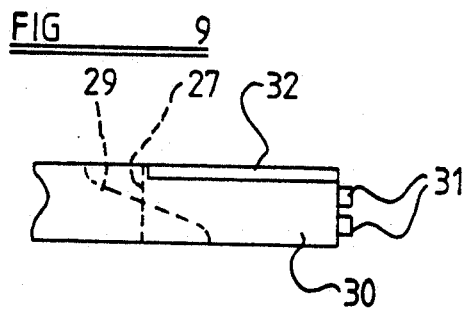
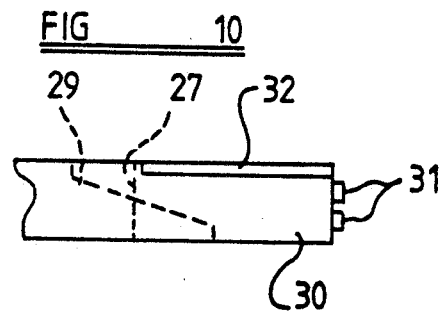
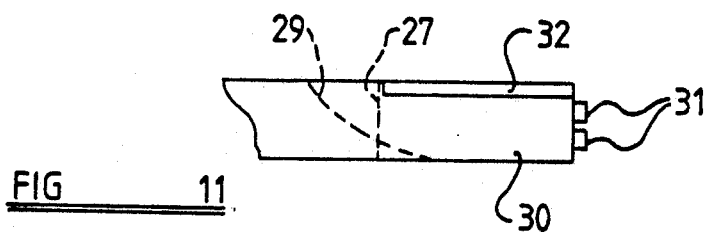
FIG 11

TURBINE BLADE REPAIR

BACKGROUND TO THE INVENTION

The present invention relates to a method of repairing turbine blades and is primarily but not exclusively concerned with the repair of blades where it is required to carry out a modification or a repair to a blade in the end region thereof.

Turbine blades may be used, for example, in steam turbines and are subjected to a harsh environment which after a while causes wear and damage to the blades.

The outer end of the turbine blades in a rotor assembly is the part of the blade which has the greatest linear speed in use and hence is the part that is most prone to damage, in particular erosion from water droplets in the steam.

It is fairly common for turbine blades, arranged in a rotor for example, to have a shroud extending around the outer ends of the blades, each blade being provided with at least one tenon at the outer end adapted to co-operate with the shroud in a manner such that each blade is secured to the shroud.

It is also common for there to be lacing wires extending through holes from one blade to another to tie together the blade, or at least groups of blades in a turbine blade array or as a still further alternative, the blades may be provided with snubbers adapted to contact each other, all the above mentioned features such as shrouds, and brazed lacing wires which have the effect of making the array as a whole more rigid and to prevent relative movement occurring between the blades in the array, or snubbers and "loose" lacing wires which reduce vibration amplitudes by friction clamping.

Turbine blades provided with shrouds may inter alia suffer from crevice corrosion. Crevice corrosion is caused by entrapment of salts carried by the steam in, for example, crevices where a shroud hole and a tenon on the blade is loose thus enabling a crevice to occur in which salt may accumulate or alternatively if the blades are provided with lacing wires, such crevices may exist in the holes in the blades or in joints in the wire itself.

Blades at the low pressure end of the turbine are also subjected to water impact in view of condensation on stator blades or nozzles which eventually causes the formation of large water droplets which subsequently break away from the stator blades or nozzles and causes substantial impact on the leading edge regions of the rotor blades. Since it is the outer end of the rotor blade that has a far greater linear speed, the damage will be far greater at the outer end.

Blades at the low pressure end of the turbine are frequently subjected to the effect of "stress corrosion cracking" which is prone to occur around discontinuities in the turbine blades, such as lacing wire holes and for example the attachment of the blade to a shroud, which attachment may be a tenon provided on the end of the blade and a through bore provided on the shroud.

The provision of new repair techniques by the applicant has enabled the satisfactory repair of turbine blades rather than the total replacement of the blade, this considerably reduces the cost of the repair and decreases the down time of the turbine and providing the repair gives satisfactory service life is hence to be preferred.

It has been proposed before by the applicant that it is unwise, where an end part of a turbine blade has to be replaced to effect the join of the new part immediately adjacent any discontinuity in the blade or adjacent, for example, an attachment of the blade to a shroud, e.g. a tenon and it is preferred to displace a join of a new part to the blade by a small distance so that the area subjected to most stress in use, for example the attachment of a tenon on the end of a blade to a shroud, is made from parent metal and not cast metal that would occur if for example a tenon was built up by a welding operation.

The position of a join of a new end piece to a turbine blade is critical since inevitably the join will constitute a critical point on the blade which, through the nature of the weld material, may not be as strong as the parent material of the blade.

It is desirable therefore that the position of the join is selected so that it is not near any discontinuity in the blade, such as a lacing wire hole and is not immediately adjacent any other position of stress concentration such as the tenon on the end of the blade.

It has been found that in use of the blades, whereas the effects of crevice corrosion cracking and general erosion are well known, other stresses applied to the blade are not significant. However, it has been found that turbine blades are at a certain time in their use subjected to a critical stress, for example at its operational speed or during the acceleration of a turbine from an at rest or steady slow angular velocity at which it is substantially at rest to its operational speed.

Each blade if untied or unconnected to adjacent blades will exhibit a number of resonant frequencies, and these frequencies are altered and indeed some modes of vibration are minimised by the inclusion of cover bands, shrouds, lacing wires, snubbers etc., and the frequency at which the blade may have otherwise been excited to vibrate at an in-use speed or operational speed of a turbine are thus minimised so that there is no undue resonance in a blade at an operational speed.

The desired speed of operation of a turbine however and the length of the blades normally results in there being speed through which a turbine must pass from its at rest speed to an operational speed at which the blade would be excited to vibrate and which causes resonance in the turbine blade and of course subjects them to considerable stress. This resonance is, as aforementioned, minimised by the provision of cover bands, lacing wires, etc., and is of little consequence.

However, applicant has found that problems do occur and damage to turbine blades can be severe if for example one blade breaks free from a cover band because, for example a tenon has broken or become eroded, and the blade is substantially untied to the remainder of the blade, apart from the securing of the blade to a rotor by its root. This permits the blade to resonate at its natural frequency, depending upon its mass and its length, at its operational speed or during acceleration or deceleration of the rotor from or to its operational speed from an at rest speed.

The natural frequency of vibration of the blade, as aforementioned determined at least in part by its mass and its length, will result in parts of the blade at positions along its length having a considerable amplitude of vibration which causes stresses in the blade far more severe than the stresses that would occur during normal use.

It is an object of the present invention to provide a new or improved method of repair to a turbine blade.

SUMMARY OF THE INVENTION

According to one aspect of the invention we provide a method of repairing a turbine blade comprising the steps of ascertaining a normal vibration characteristic of the blade, separating an outer end part of the blade from a residual inner part of the blade and subsequently securing a new end part to the residual part so that a joint between the new end part and the residual part is positioned in a predetermined relationship to said vibration characteristic.

According to a second aspect of the invention we provide a turbine blade comprising an outer end part secured to a residual inner part so that a joint between the outer end part and the inner part is positioned in a predetermined relationship to a normal vibration characteristic of the blade.

The vibration characteristic may be the position of a node or nodes of movement of the blade caused by vibration of the blade.

The node or nodes may be nodes of movement of the blade caused by resonant vibration of the blade at a natural frequency of oscillation when substantially unrestrained other than securement of an inner end of the blade to a rotor.

The vibration characteristic may be the position of maximum amplitude of movement of the blade and nodes or positions of minimum movement of the blades caused by resonance in the blade at one or other natural frequency of oscillation when substantially unrestrained other than its securement to a rotor.

The joint of the new part to the residual part of the blade may extend in a direction that has a radial component as well as a tangential component.

The joint may be a welded joint made with weld material which is a) similar to the parent metal of the blade, b) different from the parent metal of the blade.

The new part may be made of the same material as the residual part.

The new part may be made of different material to the residual part.

Where there is a single node the predetermined relationship may comprise positioning the joint so that the joint intersects or lies on the node line or
  a) when the joint is on the inner side of the node, at a distance from the node which is within a predetermined percentage of the distance between the node and the inner end of the blade,
  b) when the joint is on the outer side of the node, at a distance from the node which is within a predetermined percentage of the distance between the node and the outer end of the blade.

Where there is more than one node the predetermined relationship may comprise positioning the joint so that the joint intersects or lies on a node line or
  a) when the joint is on the inner side of the inner node, at a distance from the inner node which is within a predetermined percentage of the distance between the node and the inner end of the blade,
  b) when the joint is between nodes, at a distance from a respective node which is within a predetermined percentage of the distance between the nodes,
  c) when the joint is on the outer side of the outermost node, at a distance from the outermost node which is within a predetermined percentage of the distance from the node to the outer end of the blade.

Said predetermined percentage is selected from the group comprising 50% 25%, 20%, 15%, 10%, 5%.

A heat treatment operation may be performed to relieve any stress in the blade caused by the joining operation.

The joint between the new part and the residual part may extend in a line selected from the group comprising a straight line, a curved line, a curvilinear line or a reverse curved line, a diagonally stepped line.

According to a third aspect of the invention we provide a turbine blade when repaired by a method according to the first aspect of the invention.

This object is achieved by the invention as claimed.

The positioning of the joint in said predetermined relationship, for example at or adjacent the node ensures that if the blade is allowed to oscillate at its resonant frequency due to some failure of the connection of that blade to adjacent blades in the array, the position of the joint of the new part of the blade to the residual part of the blade is at a position that will be subjected to minimum or approximately minimum vibratory stress thus ensuring that the new end part of the blade is not likely to be detached from the remainder of the blade which of course would cause a large amount of damage to the remainder of the turbine.

Preferably, the joint of the new part to a blade to the residual part of the blade extends in a direction that has a radial component, as well as a tangential component, e.g. diagonally across the blade, which has the additional benefit of a greatest surface area of joining between the two parts and hence additional strength and does not concentrate the joint of the new part to the remainder of the blade at a single radial position, thus ensuring that if the position of the node alters due to erosion or other change in the blade, the position of the joint will still be concentrated in a position of minimum amplitude of vibration and hence minimum stress.

The repair of the blade may be made with a weld metal that is similar to the parent material or since the position of the repair is situated at a position which should not be subjected to great stress during use of the blade, it may enable the repair to be made with weld metals that can endow a blade with advantages such as enhanced characteristics to reduce wear.

One example of the repair process of the present invention will now be described by way of example only with reference to the accompanying drawings, wherein:-

BRIEF DESCRIPTION OF THE DRAWINGS

FIGS. 5, 6, 7 and 8 show a sequence of repair step, and

FIGS. 9 to 11 show alternative shapes of joint.

DESCRIPTION OF THE PREFERRED EMBODIMENTS

Figure 1:
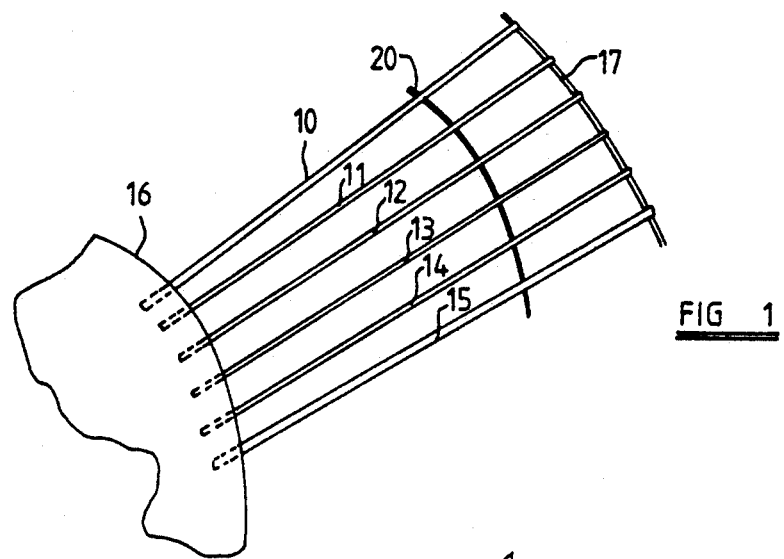
FIG. 1 illustrates part of an array of turbine blades on a rotor.

Referring first to FIG. 1, an array of turbine blades 10 to 15 are shown, each turbine blade having a root part which is secured to a rotor 16.

It will be appreciated that only a few blades have been shown in the array and in reality blades will extend circumferentially around the rotor 16.

Figure 2:
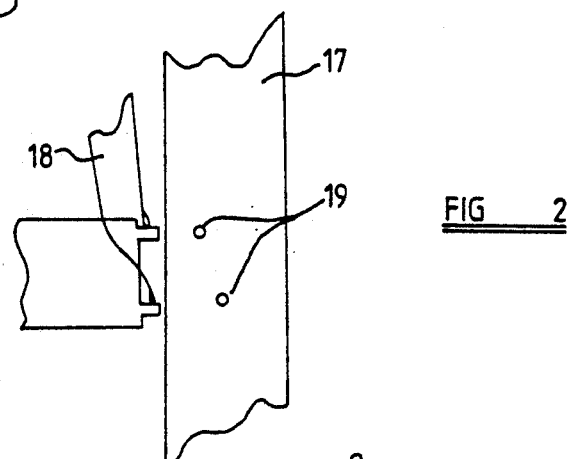
FIG. 2 illustrates the connection of a single blade to shroud.

The end of each of the blades 10 to 15 are secured to a shroud 17 in a manner for example as shown in FIG. 2.

FIG. 2 illustrates the end of the turbine blade 10 and the end region is provided with a pair of tenons 18 which are adapted to extend through bores 19 in the shroud 17. Once the tenons 18 are in position in the through bores 19 the ends thereof may be peened or otherwise worked so as to secure the blade 10 firmly to the shroud.

The turbine blades 10 to 15 are also provided with a lacing wire 20, the lacing wire 20 extending through a through bore in each of the turbine blades 10 to 15.

Figure 3:
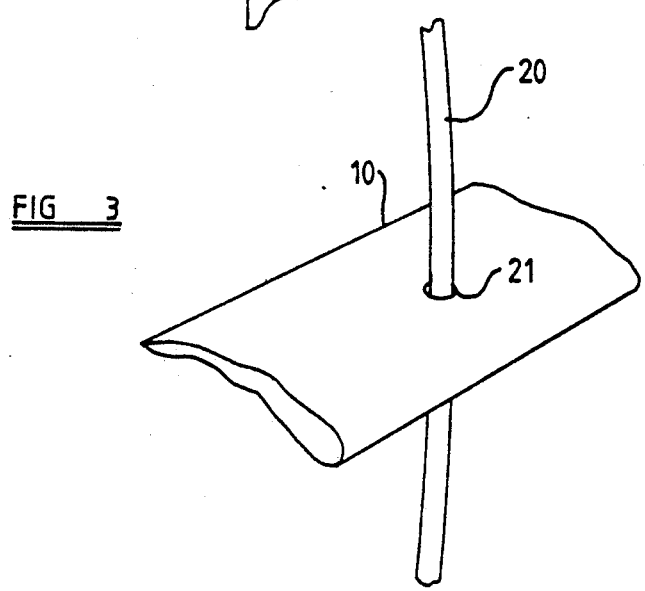
FIG. 3 is a view of a lacing wire passing through the lacing wire holes in a blade.

Referring in addition to FIG. 3, the turbine blade 10 is shown having a lacing wire hole 21 through which the lacing wire 20 passes. The lacing wire 20 may be a loose fit in the hole 21, it may be secured thereto by brazing with silver solder to prevent relative movement or contact between the lacing wire 20 and the blade 10 may be dependent upon the forces acting on the lacing wire 20 in a radially outwardly direction during use of the turbine causing sufficient surface contact between the lacing wire 20 and the blade to provide friction dampening thereby inhibiting movement between the blades 10 to 15 at the hole position.

Generally speaking the outer ends of turbine blades which in use are prone to greatest damage and wear and typically it may be the leading outer edge of the blade which becomes eroded, cracks and other faults around the tenons 18 leading to separation of a blade 10 from the shroud 17 or cracks around the lacing wire holes such as the hole 21 in blade 10.

Where the damage is relatively minor, it may be possible to repair such damage without the removal of any substantial part of any blade. However, particularly where the damage is in the end region of the blade, any repair of for example tenons 18 may necessitate a new end part of the blade and since it is already known that it is undesirable to have a join in the blade adjacent the tenons 18, the join must be spaced at least from the end region by at least a small distance.

The present invention proposes that the joint between a new end part of a blade and the remainder of the blade is situate at or adjacent a node or position of minimum movement of the blade when it is caused to resonate at its natural frequencies.

Figure 4:
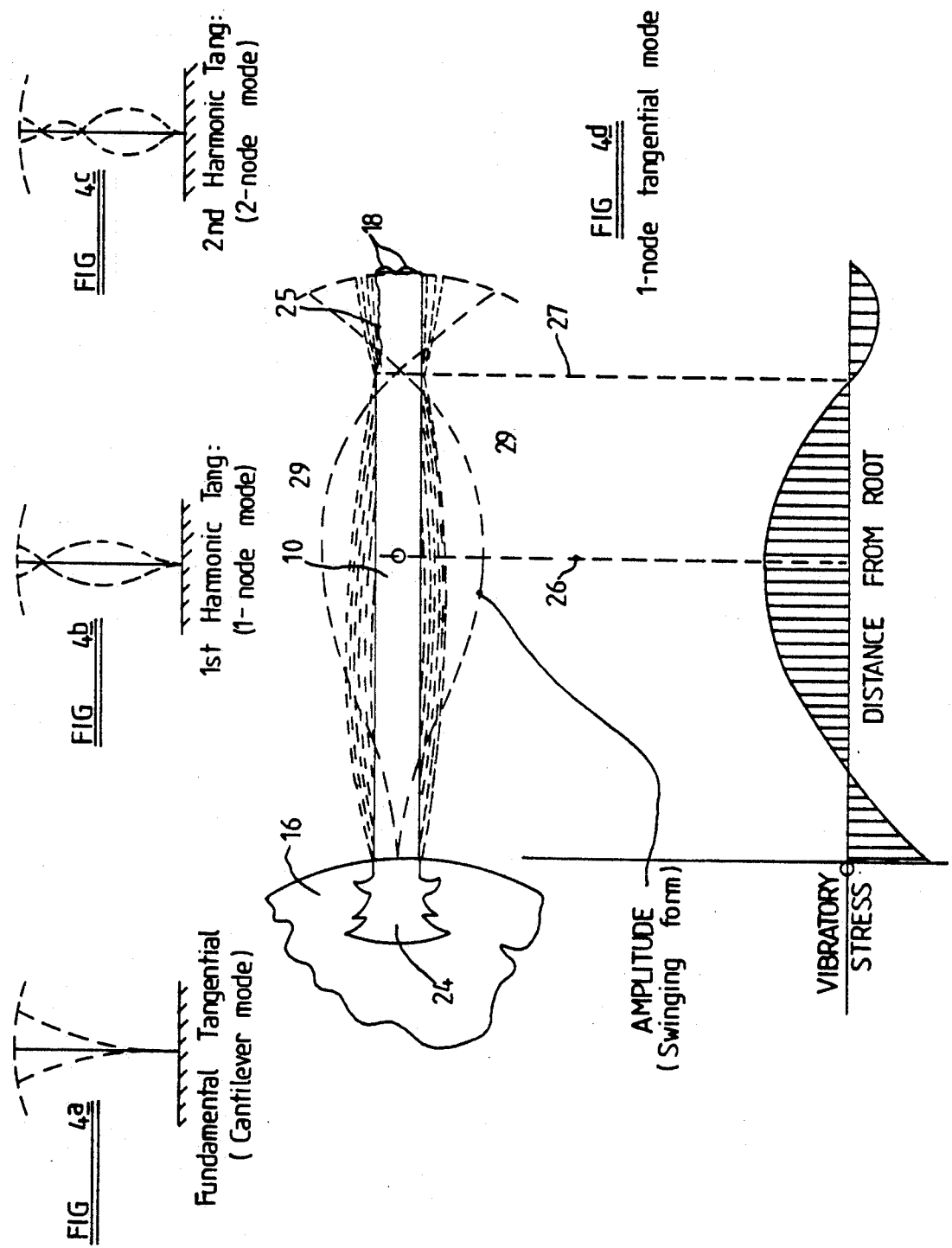
FIGS. 4a, 4b and 4c are diagrammatic illustrations of the frequencies of vibration on a turbine blade.
FIG. 4d illustrates a single turbine blade showing an exaggerated amplitude of movement of the blade and a graph showing vibratory stress.

FIG. 4a illustrates the natural frequency of movement of a single blade in cantilever mode, FIG. 4a showing the movement of an unrestrained blade in a fundamental tangential mode.

FIG. 4b shows a first harmonic tangential mode and FIG. 4c shows a second harmonic tangential mode.

Referring to FIG. 4d, the blade 10 is shown in isolation, it is however still secured to the rotor 16 by its root which can be seen at 24.

It can be seen from FIG. 4d that the tenons 18 are in a damaged state and erosion has occurred at an area 25 which is the leading outer edge of the turbine blade 10.

The normal blade 10, i.e. when undamaged, will oscillate when unrestrained by lacing wires, shrouds etc., in a manner shown in exaggerated form by dashed line 29 and it can be seen that there is a position of maximum movement indicated by vertical dashed line 26 which will show the position of maximum vibratory stress as indicated on the diagrammatic illustration with reference to distance from the root of the blade.

There is a position of maximum movement on dashed line 26 and a node or position of minimum movement along dashed line 27.

It will be appreciated that the node as shown dashed line 27 would not occur when the blade 10 is in its normal configuration with the shroud 17 attached and the lacing wire 20 in position.

Figure 5:
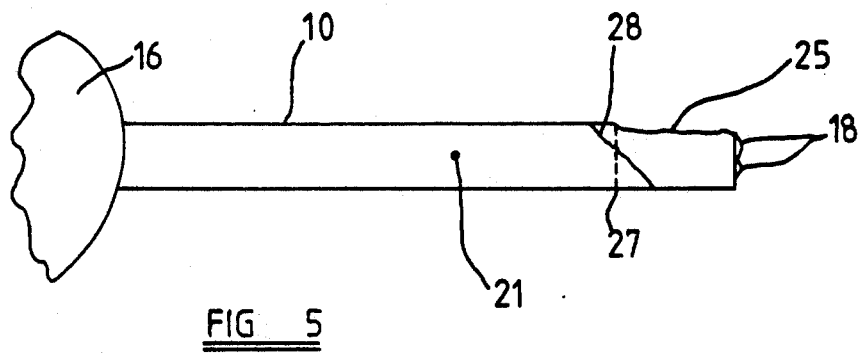

Referring now in addition to FIGS. 5 to 8, a sequence of repair steps is illustrated and in FIG. 5 the blade 10 is shown having damaged tenons 18, unattached wire 21 and an eroded leading outer edge part 25, the node line being shown at 27.

A diagonal cut 28 is made in the blade to remove the complete damaged end part and it will be seen that the diagonal cut 28 is made more or less across the area of minimum amplitude at the resonant frequency of the blade as shown by the line 27.

Figure 6:
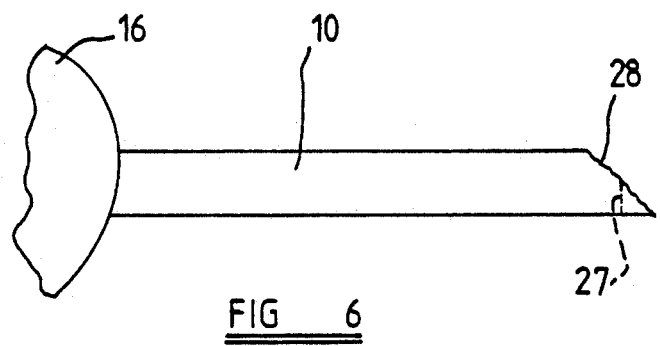

FIG. 6 illustrates the blade 10 with the end part removed and the lacing wire hole 21 having been filled. It is important as has already been proposed to eliminate discontinuities in the blade prior to the application of substantial thermal energy that occurs during a welding operation for example and/or heat treatment to the blade since this minimises the occurrence of concentrations of stress caused by excessive temperature gradients.

Figure 7:
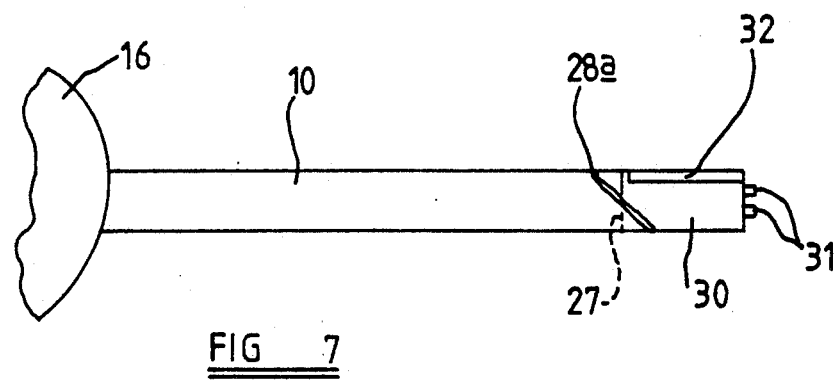

Referring to FIG. 7, the blade 10 has a new part 30 with new tenons 31 and a hardened leading edge portion 32 which may for example comprise an insert of a very hard material such as a cobalt-chromium alloy or may comprise a suitably hardened steel or hardened region, the new part is secured by welding 28a along the line 28 to the remainder of the blade 10. After welding, the weld area around the resultant joint (FIG. 8) 29 may be machined so that the whole of the blade is at its correct shape, the blade may then be subjected to any desired heat treatment process to stress relieve the blade and after all heat treatment processes have been carried out the lacing wire hole 21 is re-formed.

The blade has thus been satisfactorily repaired and the new piece of material 30 secured to the blade at a position, not as one might expect of minimum amplitude of oscillation at its natural frequency when the shroud and lacing wire is in position, but at a position of minimum amplitude of oscillation at its resonant frequency when the blade, apart from the securement by the root to the rotor, is otherwise unrestrained since it is in such a state that it has been found the blade is subjected to the greatest stresses, albeit this is a state that only occurs when some damage has already occurred and in particular disconnection of the blade from the shroud, however when such as even occurs failure of an end part of the blade could cause considerable damage to the remainder of the turbine.

The repair process of the present invention minimises such an occurrence.

FIGS. 9 to 11 show alternative embodiments in which the resultant joints 29 extend in other directions than the diagonal direction shown in FIGS. 5 to 8. They show, respectively, a reverse curved line, a stepped diagonal line and a curved or curvilinear line.

Whilst it is preferred that the lines intersect the node line 27 or, if a joint line which extends tangential to the blade is provided, in the node line, if desired the joint may be positioned in the following predetermined relationship with the node.

Where the normal vibration characteristic of the blade has a single node, then when the joint lies on the inner side of the single node the joint may be at a distance from the node which is within a predetermined percentage of the distance between the node and the inner end of the blade. When the joint is on the outer side of the node the joint may be at a distance from the node which is a predetermined percentage of the distance between the node and the outer end of the blade.

Where there is more than one node then, when the joint is on the inner side of the inner node the joint may be at a distance from the node which is a predetermined percentage of the distance between the inner node and the inner end of the blade.

When the joint is between nodes the joint may be at a distance from a respective node which is within a predetermined percentage of the distance between the respective nodes.

When the joint is on the outer side of the outermost node the joint may be at a distance from the outermost node which is within a predetermined percentage of the distance between the outermost node and the outer end of the blade.

Where the joint intersects a node the ends of the joint may lie within the above described respective limits.

The predetermined percentage may be 50%, 25%, 20%, 10% or 5% in increasing order of preference.

If desired, the new part may be made of the same material as the residual part of the blade or may be made of different material such as a harder material to give an extended life. The hardened leading edge portion 32 may be provided on only the new part or may extend into a portion of the residual part. Where the new part is made of different material to the material of the residual part it may avoid the need to carry the leading edge portion 32 onto the residual part.

The normal vibration characteristic of the blade may be determined by calculation by performing a finite element analysis in conventional manner or empirically by exciting the blade, when static, with a suitable exciter, such as a moving coil vibrator, and sensing the vibration characteristics of the blade with a suitable sensor probe, such as a piezo-electric transducer which senses the acceleration of the blade at the position of the probe and causes this to be displayed, for example on an oscilloscope.

Whilst normally the position of the node or nodes are thus determined, if desired, the position(s) of maximum vibration or anti-node(s) may be determined and the joint positioned away from the anti-node(s). The distance of spacing in this case may be inversely proportional to the distances described above in relation to nodes.

The features disclosed in the foregoing description, or the accompanying drawings, expressed in their specific forms or in the terms or means for performing the desired function, or a method or process for attaining the disclosed result, may, separately or in any combination of such features, be utilised for realising the invention in diverse forms thereof.

I claim:

1. A method of repairing a turbine blade provided with an inner, root end and an opposed outer end and having a damaged part adjacent the outer end of the blade, comprising:
   (a) determining the position of a node of minimum amplitude of oscillation of the blade along its length between the inner end and the outer end at the resonance frequency of the blade when it is unrestrained except by attachment of the root to a rotor;
   (b) separating the damaged outer part of the blade in the region of the node the position of which is determined in accordance with step (a) thereby leaving a residual, undamaged part of the blade including the root, and
   (c) joining a new outer end part to the residual part of the blade in the region of separation according to step (b).

2. A method according to claim 1 wherein the joint of the new part to the residual part of the blade extends in a direction diagonally across the blade in the region of the node.

3. A method according to claim 1 wherein the joint between the new part and the residual part of the blade is a welded joint made with weld material which is harder and more erosion resistant than the parent metal of the blade.

4. A method according to claim 1 wherein the node is a single node defining a node line extending across the width of the blade and the joint between the new part and the residual part of the blade is positioned:
   (a) so that the joint intersects or lies on the node line, or
   (b) when the joint is on the inner side of the node, at a distance from the node which is within a predetermined percentage of the distance between the node and the inner end of the blade, or
   (c) when the joint is on the outer side of the node, at a distance from the node which is within a predetermined percentage of the distance between the node and the outer end of the blade, and
wherein, said predetermined percentage is selected from the group consisting of 50%, 25%, 20%, 15%, 10% and 5% in increasing order of preference.

5. A method according to claim 1 wherein there is more than one node, each defining a node line extending across the width of the blade, and the joint is positioned:
   (a) so that the joint intersects or lies on a node line, or
   (b) when the joint is on the inner side of the inner node, at a distance from the inner node which is within a predetermined percentage of the distance between the node and the inner end of the blade, or
   (c) when the joint is between nodes, at a distance from a respective node which is within a predetermined percentage of the distance between the nodes, or
   (d) when the joint is on the outer side of the outermost node, at a distance from the outermost node which is within a predetermined percentage of the distance from the node to the outer end of the blade, and
wherein, said predetermined percentage is selected from the group consisting of 50%, 25%, 20%, 15%, 10% and 5% in increasing order of preference.

6. A method according to claim 3 wherein a heat treatment operation is performed to relieve any stress in the blade caused by the joining operation.

7. A method according to claim 1, wherein the joint between the new part and the residual part of the blade extends in a line selected from the group consisting of a straight line, a curved line, a curvilinear line, a reverse curved line, and a diagonally stepped line.

8. A repaired turbine blade of the type having an inner, root end and an opposed, outer end and wherein a portion of the blade including the outer end comprises a new part joined to a residual original part at a joint located in the region of a node the position of which is determined as a position of minimum amplitude of oscillation of the blade along its length from the inner end to the outer end at the resonance frequency of the blade when it is unrestrained except by attachment of the root to a rotor.

9. A repaired turbine blade according to claim 8, wherein the joint of the new part to the residual part of the blade extends in a direction diagonally across the blade in the region of the node.

10. A repaired turbine blade according to claim 8, wherein the joint is a welded joint made with weld metal which is harder and more erosion resistant than the parent metal of the blade.

11. A repaired turbine blade according to claim 8, wherein the node is a single node defining a node line extending across the width of the blade and the joint between the new part and the residual part of the blade is positioned:
   (a) so that the joint intersects or lies on the node line, or
   (b) when the joint is on the inner side of the node, at a distance from the node which is within a predetermined percentage of the distance between the node and the inner end of the blade, or
   (c) when the joint is on the outer side of the node, at a distance from the node which is within a predetermined percentage of the distance between the node and the outer end of the blade, and wherein, said predetermined percentage is selected from the group consisting of 50%, 25%, 20%, 15%, 10% and 5% in increasing order of preference.

12. A repaired turbine blade according to claim 8 wherein there is more than one node, each defining a node line extending across the width of the blade, and the joint is positioned:
   (a) so that the joint intersects or lies on a node line, or
   (b) when the joint is on the inner side of the inner node, at a distance from the inner node which is within a predetermined percentage of the distance between the node and the inner end of the blade, or
   (c) when the joint is between nodes, at a distance from a respective node which is within a predetermined percentage of the distance between the nodes, or
   (d) when the joint is on the outer side of the outermost node, at a distance from the outermost node which is within a predetermined percentage of the distance from the node to the outer end of the blade, and wherein, said predetermined percentage is selected from the group consisting of 50%, 25%, 20%, 15%, 10% and 5% in increasing order of preference.

13. A turbine blade according to claim 8, wherein the joint between the new part and the residual part of the blade extends in a line selected from the group consisting of a straight line, a curved line, a curvilinear line, a reverse curve line, and a diagonally stepped line.

14. A repaired turbine blade according to claim 8, wherein the joint is a welded joint made with weld metal which is similar to the parent metal of the blade.

* * * * *